Jan. 29, 1957 S. DARLINGTON 2,779,539

MULTIPLE CODE WHEEL ANALOGUE-DIGITAL TRANSLATOR

Filed April 19, 1954 6 Sheets-Sheet 1

| REFLECTED BINARY | DECIMAL | NATURAL BINARY |
|---|---|---|
| 0000 | 0 | 0000 |
| 0001 | 1 | 0001 |
| 0011 | 2 | 0010 |
| 0010 | 3 | 0011 |
| 0110 | 4 | 0100 |
| 0111 | 5 | 0101 |
| 0101 | 6 | 0110 |
| 0100 | 7 | 0111 |
| 1100 | 8 | 1000 |
| 1101 | 9 | 1001 |
| 1111 | 10 | 1010 |
| 1110 | 11 | 1011 |
| 1010 | 12 | 1100 |
| 1011 | 13 | 1101 |
| 1001 | 14 | 1110 |
| 1000 | 15 | 1111 |

INVENTOR
S. DARLINGTON
BY Hugh S. Wertz
ATTORNEY

INVENTOR
S. DARLINGTON
BY Hugh S. Wertz
ATTORNEY

INVENTOR
S. DARLINGTON
BY Hugh S. Wertz
ATTORNEY

INVENTOR
S. DARLINGTON
BY Hugh S. Wertz
ATTORNEY

Jan. 29, 1957 S. DARLINGTON 2,779,539
MULTIPLE CODE WHEEL ANALOGUE-DIGITAL TRANSLATOR
Filed April 19, 1954 6 Sheets-Sheet 5

INVENTOR
S. DARLINGTON
BY Hugh S. Wertz
ATTORNEY

Jan. 29, 1957 S. DARLINGTON 2,779,539

MULTIPLE CODE WHEEL ANALOGUE-DIGITAL TRANSLATOR

Filed April 19, 1954

6 Sheets-Sheet 6

INVENTOR
S. DARLINGTON
BY Hugh S. Wertz
ATTORNEY

United States Patent Office 2,779,539

Patented Jan. 29, 1957

2,779,539

MULTIPLE CODE WHEEL ANALOGUE-DIGITAL TRANSLATOR

Sidney Darlington, Passaic Township, Morris County, N. J., assignor to Bell Telephone Laboratories, Incorporated, New York, N. Y., a corporation of New York Application April 19, 1954, Serial No. 423,950

8 Claims. (Cl. 235—61)

This invention relates to improvements in analogue-digital converters of the type in which more than one code indicating element is employed.

In the operation of a digital computing apparatus input information must be supplied to the computer in digital form. The required information, however, is often available in terms of a continuous variable, such as the position of shaft on which a directional antenna is located, for specific example. Before this analogue information can be utilized, it must be translated into digital form.

One known method of translating from analogue to digital information utilizes a transparent code wheel which is rotatably coupled to the source of analogue information. Separate rings on the wheel represent the digits of a desired code, and each of these rings is composed of opaque and transparent portions corresponding to the desired digital representation. Optical reading heads for the digit rings change their output indications depending on the transparency or opaqueness of the adjacent portions of the digit rings, and thus yield a digital representation of the angular position of the code wheel.

When it is desired to obtain a very accurate digital representation of the angular position of a code wheel of limited size, the inscriptions on the code wheel must be very acurate. In addition, the reading means must have very high resolution, to distinguish between the closely spaced different readings. To overcome this difficulty, it has previously been proposed to employ two code wheels coupled together, with the fine code wheel making several revolutions for one of the coarse code wheel. However, the obvious arangement of inscriptions and reading heads, with two-speed code wheels, does not reduce either the required accuracy of inscriptions on the coarse wheel or the required resolving power of the associated reading means. In addition, the known translators which do accomplish these purposes require the additional expense of two complete reading heads for the coarse wheel.

Accordingly, the principal object of the present invention is to decrease the cost of analogue-digital translators which employ coarse and fine code indicating elements.

A collateral object is to relax the synchronization tolerances required in reading the two code indicating elements.

In accordance with the present invention, it has been determined that it is possible to reduce the required accuracy of inscriptions on the coarse code wheel concurrently with the use of but one associated reading means of reduced resolving power. In the realization of these objectives as disclosed in detail hereinafter, the digit indications on the coarse and fine code elements overlap in the least significant digit on the coarse (or slow speed) code element and the most significant digit on the fine (or fast) code element, and the zero indication of the coarse code element is displaced from the zero of the fine code wheel by an amount corresponding to approximately one quarter revolution of the fine code wheel. In addition, an electronic logic circuit utilizes the information from the coarse and fine code elements concurrently to derive an unambiguous digital representation of the position of the coupled code elements.

A feature of the present invention resides in the reduction in the amount of physical equipment required in two speed code wheel arrangements, and a reduction in the tolerances required in other elements of the structure.

The invention will be more readily understood by referring to the following description taken in connection with the accompanying drawings and forming a part thereof, in which.

Figures 1, 2:
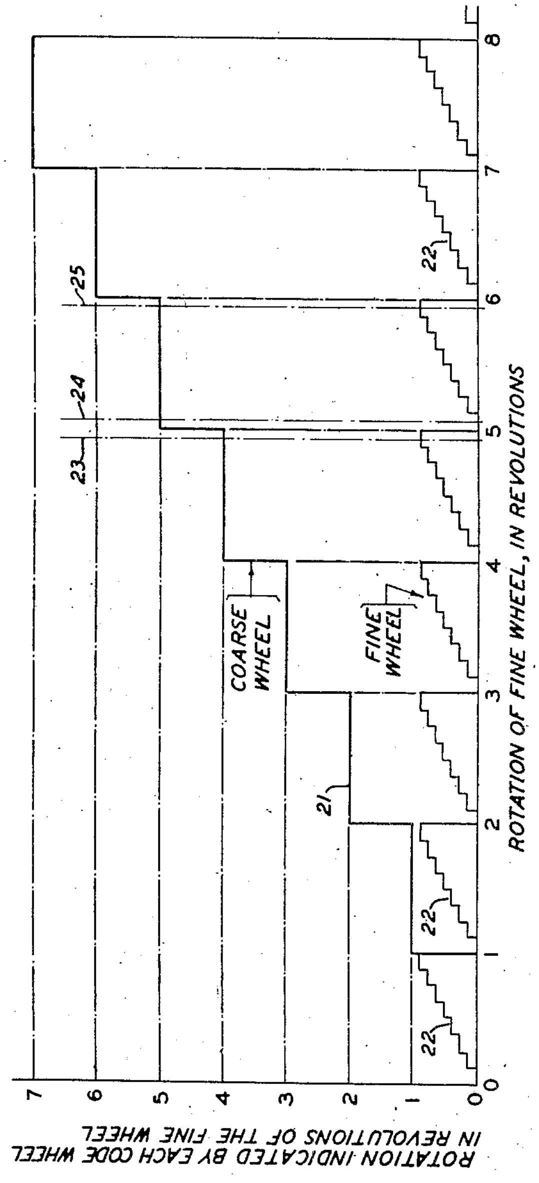
Fig. 1 is a chart which illustrates a source of error in prior art two-speed code wheel systems.
Fig. 2 is a table relating numbers of the reflected and natural binary systems with decimal numbers.

Referring more particularly to the drawings, Fig. 1 shows the output indications from a two-speed code wheel of the prior art, in terms of full revolutions of the fine (or high speed) wheel. In Fig. 1 the plot 21 represents the output indication of the coarse wheel, and the series of plots 22 represents the repetitive fine wheel indications. It may be observed that the fine wheel rotates 8 times while the coarse wheel is making a single revolution, and that the fine wheel should change its indication from ⅞ to 0 (or vice versa) at the same time the coarse wheel changes its output indication.

Substantial errors in the output digital indication can readily arise in prior art two-speed code wheel systems of the type indicated in Fig. 1, when the transitions of the two code wheels are not precisely synchronized. For example, the transition between 4⅞ and 5 revolutions of the fine code wheel will now be considered by reference to lines 23 and 24 of Fig. 1. If the two wheels are precisely synchronized, the coarse wheel output indication (21) will shift from 4 to 5 at exactly the same instant that the fine wheel output 22 indication shifts from ⅞ to 0. However, if the coarse wheel indication shifts first, the combined output indications of the coarse and fine wheels will be 5⅞ instead of 4⅞ or 5, erroneously indicating that the position of the wheels is that indicated by the dashed line 25 rather than that of lines 23 or 24. Errors of this type are obviated by the systems disclosed in the balance of the present specification.

Fig. 2 is a table introduced for reference purposes which relates numbers expressed in the natural and reflected binary systems with numbers expressed in the decimal system. The natural binary system has a base (or radix) of two, but is otherwise very similar to the conventional decimal system, which has a base (or radix) of ten. Because mathematical operations can be handled simply in the natural binary system, it is used in many digital computers. The reflected binary code is, like the natural binary code, based on two, and has the advantage that only one digit of a number changes as you proceed from any given number to the next higher or lower number. The reflected binary system is not, however, well-suited for mathematical operations.

Figures 3, 4:
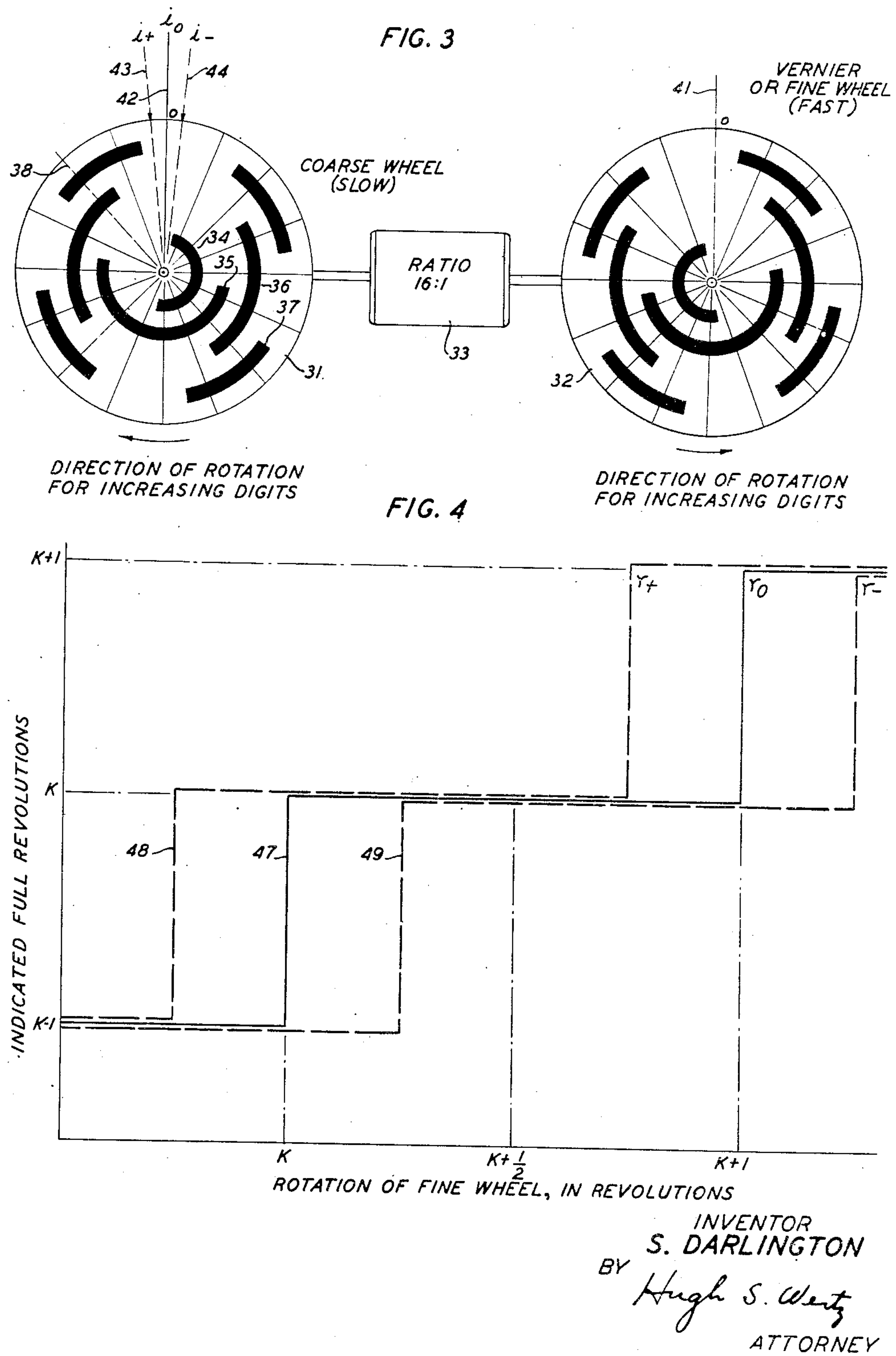
Fig. 3 is a schematic illustration of a two-speed code wheel arrangement which forms part of an analogue to digital converter.
Fig. 4 is a plot indicating the mode of operation of the device illustrated in Fig. 3.

Fig. 3 shows by way fo example and for purposes of illustration, a two-speed code wheel arrangement in accordance with the invention which employs two reading heads associated with the coarse code wheel. Only one of the two reading heads is used at any one time, the choice depending on the angle read from the fine wheel.

The coarse wheel 31 of Fig. 3 is coupled to the fine wheel 32 by gearing indicated at 33 as having a 16:1 ratio, for example. The coarse code wheel 31 includes four digit rings 34, 35, 36, and 37 which are arranged to correspond to the reflected binary code illustrated in Fig. 2. It may be noted, therefore, that the line 38 corresponds to the reflected binary number 0011 and thus to the decimal number 2. A reading corresponding to the line 38 would thus indicate two full revolutions of the fine wheel 32.

The reading heads which derive a digital indication from the opaque portions of the code rings on the transparent code wheels 31, 32 may be of the type disclosed in an article entitled "An optical position encoder and digit register" by H. G. Follingstadt, J. N. Shive, and R. E. Yaeger, which appeared at pp. 1573 to 1583 of the November 1952 issue of the Proceedings of the Institute of Radio Engineers. These reading heads could include a bright source of light, a reading slit, and photocell units individual to each digit ring. In the case of the reading heads for the system of Fig. 3, each reading head includes four photocell units (one for each digit ring), and the output or lack of output from the photocells indicates the position of the code wheel in the reflected binary code of Fig. 2.

The coarse and fine code wheels are shown in their zero position in Fig. 3. The single reading head of the vernier or fine code wheel 32 is vertical and the indications derived from this reading head are observed along the index line 41 of Fig. 3. Neither of the two reading heads for the coarse code wheel are located along the zero index line $i_0$ which is labeled 42 in Fig. 3. Instead, the two reading heads are located along the lines 43 and 44 which correspond to one quarter revolution of the fine code wheel positive and negative, respectively, with respect to the zero index line $i_0$. Employing a 16:1 ratio between the fast and slow wheels, the reading heads associated with the coarse wheel are displaced 1/64 of a revolution from the zero index line.

The plots of Fig. 4 are useful in explaining the coordination between the coarse and fine wheel output indications. In Fig. 4 the solid line plot 47 ($r_0$) indicates the true full revolutions of the fine wheel. The dotted line 48 ($r+$) indicates the readings of the coarse reading head $i+$ (located along line 43 of Fig. 3), while the dotted line plot 49 ($r-$) represents the readings of the other coarse reading head $i-$ (located along line 44 of Fig. 3).

It is clear from Fig. 4 that reading head $r+$ reads in fact the true full revolutions of the fine wheel over an interval which brackets that in which the fractional revolution of the fine wheel is less than one-half. Similarly, the reading head $r-$ reads the true full revolutions whenever the fractional revolution of the fine wheel is greater than one-half revolution. Accordingly, the fine wheel reading is employed to control the choice of coarse wheel reading head so that true full revolutions are always read. Specifically, fine wheel readings less than one-half switch in coarse wheel reading head $r+$, and fine wheel readings greater than one-half switch in reading head $r-$.

Errors in the coarse wheel inscriptions, readings, and any other coarse wheel errors, displace the curves 48 and 49 for reading heads $i+$ and $i-$, respectively, to the left or right in Fig. 4. The outputs from the coarse and fine reading heads will still be correct, however, provided the errors total less than one-quarter revolution of the fine wheel. The magnitude of this safety factor may be deduced from Fig. 4 by noting that the level portions of the plots $r+$ and $r-$ extend one-quarter revolution beyond the portions of these plots which are utilized.

Figure 5:
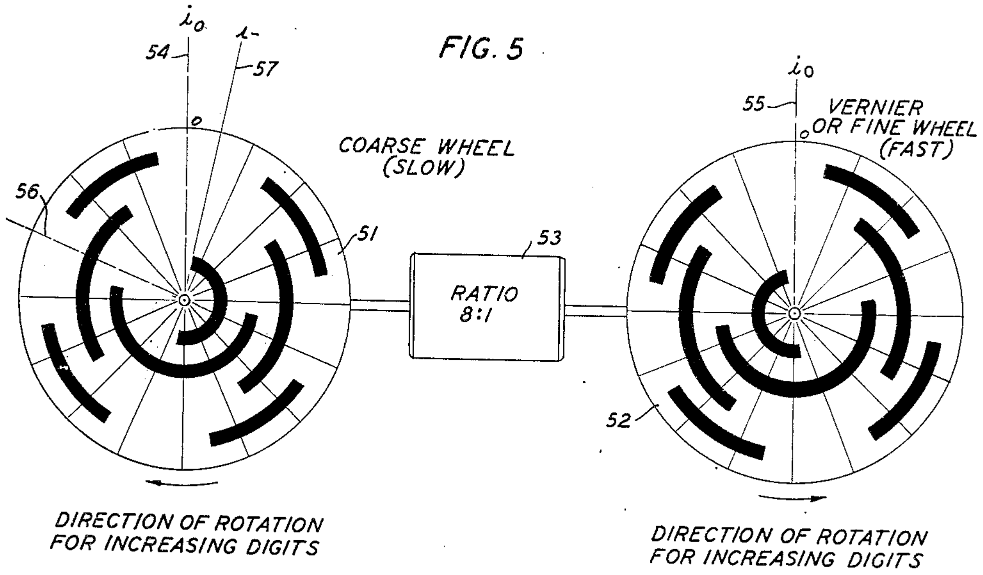
Fig. 5 illustrates a two-speed code wheel which constitutes a preferred form of the invention.

Fig. 5 illustrates a preferred embodiment of the invention which operates in much the same manner as the arrangement of Figs. 3 and 4, and has the additional advantage that only one reading head is employed in conjunction with the coarse code wheel. To facilitate an understanding of the arrangement of Fig. 5, it is useful to compare it with the system of Figs. 3 and 4, with one of the two coarse reading heads being replaced by a "phantom" reading head. Specifically, the data observed by the single reading head is employed to compute what the second head would have observed if it had, in fact, been present. It has been discovered that this is possible provided the coarse wheel 51 of Fig. 5 is read to half revolutions of the fine wheel 52 instead of only to full revolutions as in the systems of Figs. 3 and 4.

Figure 6:
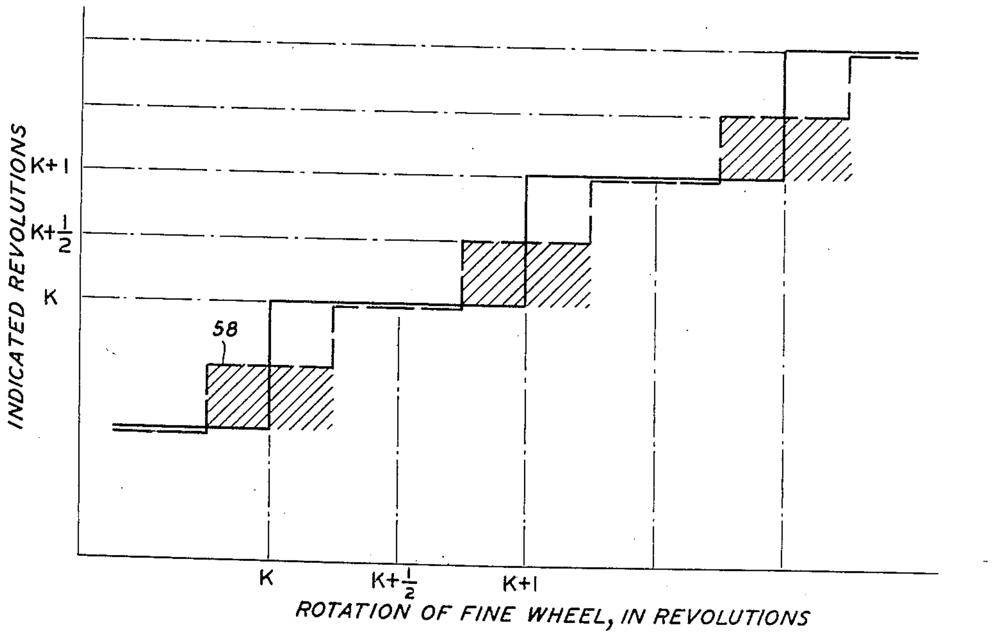
Figs. 6 and 7 are plots illustrating the mode of operation of the converter of Fig. 5.

Comparing Fig. 5 with Fig. 3, it may be noted that the gear ratio indicated at 53 in Fig. 5 is 8:1 instead of the 16:1 ratio of Fig. 3 so that the coarse wheel 51 will read to half revolutions of the fine wheel 52. As in Fig. 3, the index lines 54 and 55 for the coarse and fine code wheels, respectively, are located vertically and the code wheels as illustrated are in their zero position. The code wheels are both inscribed with reflected binary code. To illustrate the reading of the coarse wheel to half revolutions of the fine wheel, it may be noted that the line 56 in Fig. 6 represents a reading of 1½ rotations of the fine code wheel.

The one reading head for the coarse wheel is located along the line 57 in Fig. 5 and corresponds to the line $i-$ (44) of Fig. 3 and is offset from the zero index line 54 by an annular distance corresponding to a quarter revolution of the fine wheel 52. In Fig. 6 the half revolutions observed by the coarse reading head are plotted against the rotation of the fine wheel. Comparing this plot with Fig. 4 it may be noted that if the shaded half steps of the plot 58 are deleted, the $r-$ curve 49 of Fig. 4 is matched exactly. As will be explained in detail hereinafter, the half steps are, in fact, deleted by translating the reflected binary code into natural binary code and dropping the least significant digit.

Figure 7:
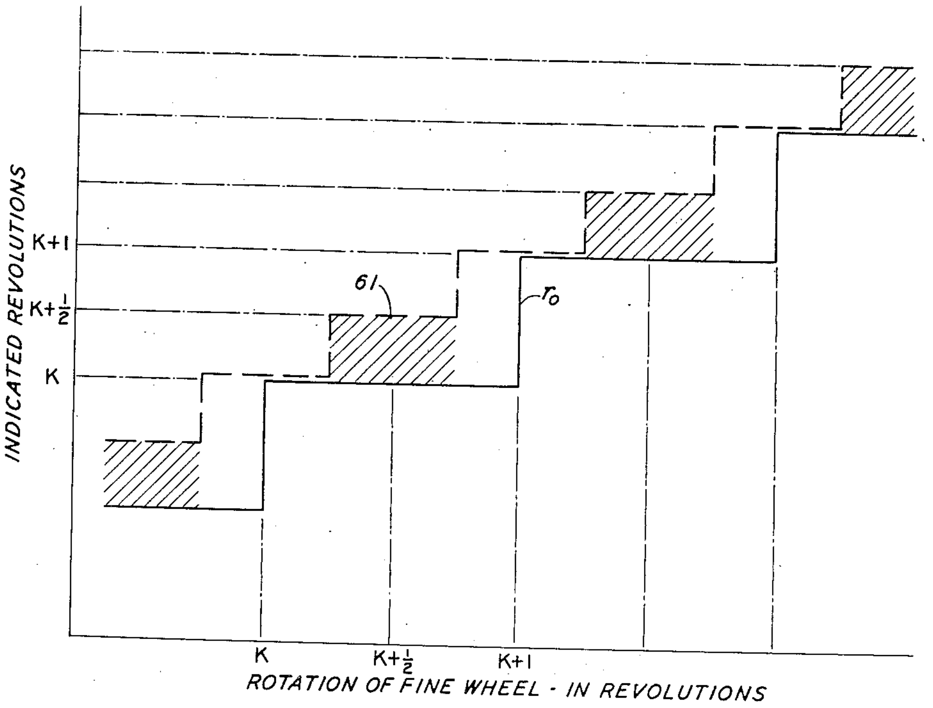

Referring to Fig. 7, if one-half revolution is added to observed half revolutions of the coarse reading head located along line 57, the curve 61 is obtained. If the shaded half steps are again deleted, the $r+$ curve 48 of Fig. 4 is matched. The deletion is accomplished by dropping the least significant coarse wheel digit after translating from reflected to natural binary code and making the above-mentioned addition. Accordingly, the selection of the proper reading head in the two reading head system may be paralleled in the one reading head system in the following manner:

1. Half revolutions of the fine wheel are read in reflected binary code on the coarse wheel with the reading head oriented as indicated by line 57 in Fig. 5.
2. The reflected binary code is translated into ordinary binary code.
3. If the fine wheel reading is less than a half revolution, a half revolution is added to the coarse wheel data.
4. The least significant digit is dropped, and the remainder represents the true full revolutions of the fine wheel.

Reference to the table of the natural binary code in Fig. 2 reveals that the condition in rule 3 above corresponds to the most significant digit on the fine wheel being equal to zero.

Figure 8:
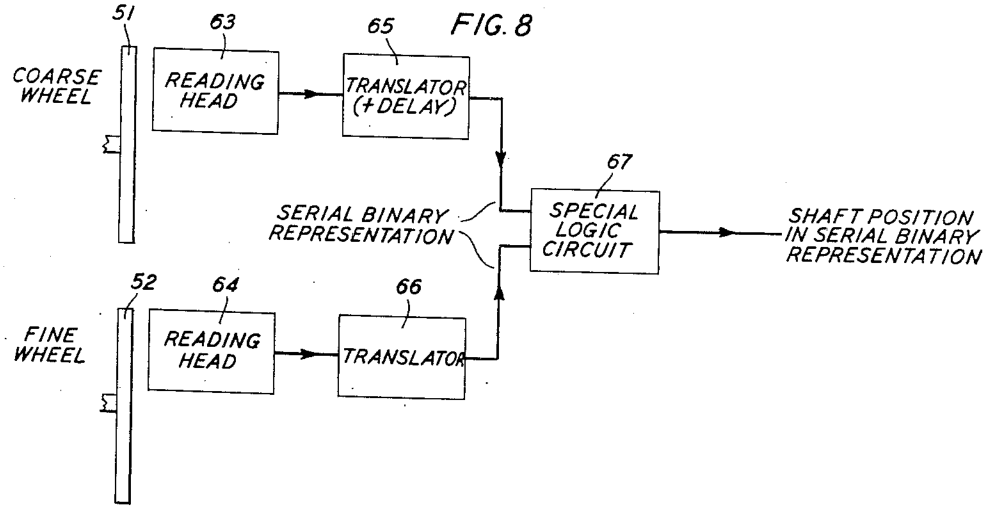
Fig. 8 is a schematic showing of the equipment associated with the two-speed code wheel arrangement shown in Fig. 5.

Fig. 8 is a schematic diagram of various components of the converter system which are required in order to carry out the rules set forth above. The indications which are read by reading heads 63 and 64 from the coarse and fine wheels 51 and 52, respectively, are in reflected binary code and may be considered to be in parallel form. The term "parallel' is employed because the individual digital outputs appear in separate electrical circuits. This is in contrast with the serial digital representations, in which a number is represented by a series of pulses on a single lead, which is employed by many digital computers in order to increase their capacity.

The translating elements 65 and 66 in Fig. 8 translate the parallel reflected binary indications which are derived from the code wheels into serial natural binary form. Inasmuch as these translators are conventional and have been described in the above-mentioned Institute of Radio Engineers article, for example, they will not be discussed in detail here. After delaying the coarse wheel code indications, the outputs from the two translators 65 and 66 are combined in a special logic circuit 57 and yield a single serial binary representation of the position of the two code wheels suitable for use in a digital computing machine.

Figure 9:
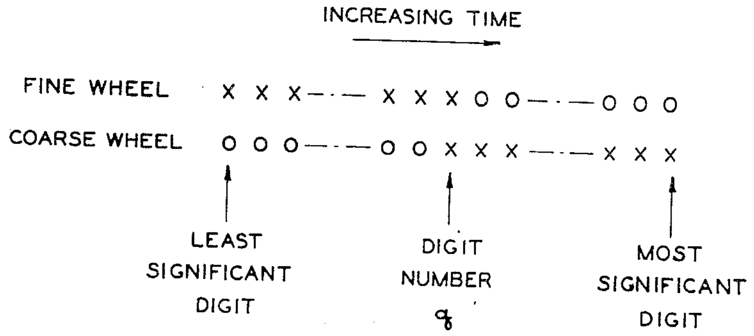
Fig. 9 is a diagram which indicates the timing of the pulses from the coarse and fine code wheels shown in Figs. 5 and 8.

The special logic circuit 67 of Fig. 8 will now be discussed in detail in connection with Figs. 9 through 11. The diagram of Fig. 9 indicates the serial binary outputs from the translators 65 and 66 of Fig. 8, and shows their time relationship. In this diagram the symbol $x$ represents meaningful numbers in the binary system which may be either 1's or 0's while the symbols $o$ in this diagram indicate the absence of any meaningful information. The digit number $q$ has an $x$ in both the fine wheel and coarse wheel number indications, and this corresponds to the overlap between the outer digital ring of the coarse wheel and the inner digital ring of the fine wheel in Fig. 5. It should be noted that the diagram of Fig. 9 has been generalized to apply to code wheels having more than four digits on each code wheel, and thus has more than four meaningful digits ($x$'s) in each row.

The circuit which combines the digital indications from the fine and coarse wheels is designed so that output digits previous to and including the number $q$ match the fine wheel sequence even though the coarse wheel digit number $q$ disagrees. The coarse wheel digit number $q$ is used only to control modification of more significant digits. This modification is called for only under the following simultaneous conditions:

1. The fine wheel digit number $q$ is zero so that rule 3, as set forth above, requires the addition of a 1 to the same coarse wheel digit.

2. Coarse wheel digit $q$ is 1 so that the addition of the 1 leads to a "Carry."

A "truth table," or a table indicating outputs for given inputs, for digit time $q$ may thus be tabulated as follows:

| Fine Wheel, Input | Coarse Wheel, Input | Output | Carry to Next Coarse Digit |
|---|---|---|---|
| 0 | 0 | 0 | 0 |
| 0 | 1 | 0 | 1 |
| 1 | 0 | 1 | 0 |
| 1 | 1 | 1 | 0 |

If no "Carry" is indicated, later output digits are merely those of the coarse wheel sequence. If a "Carry" is indicated, the coarse wheel sequence is modified by the usual rules of binary addition.

Figure 10:
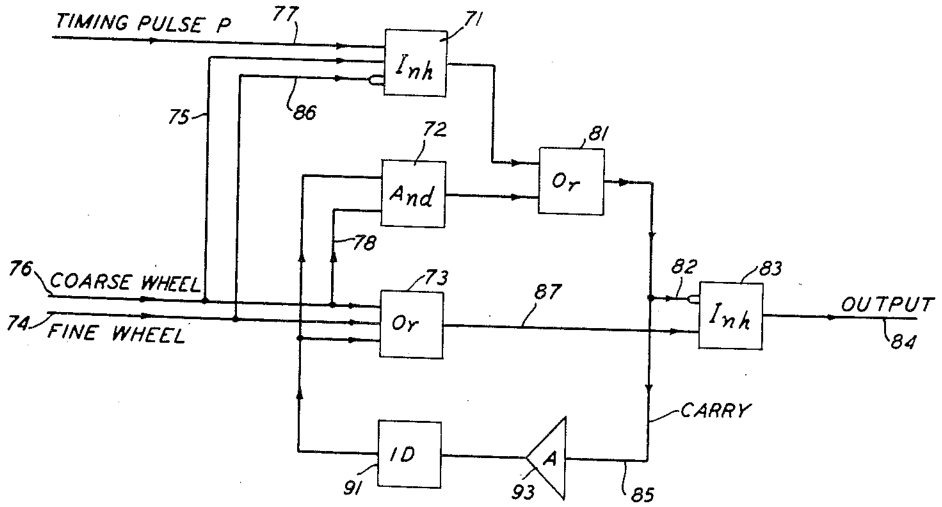
Fig. 10 is a block diagram of a logic circuit suitable for use in the system of Fig. 8.
Figure 11:
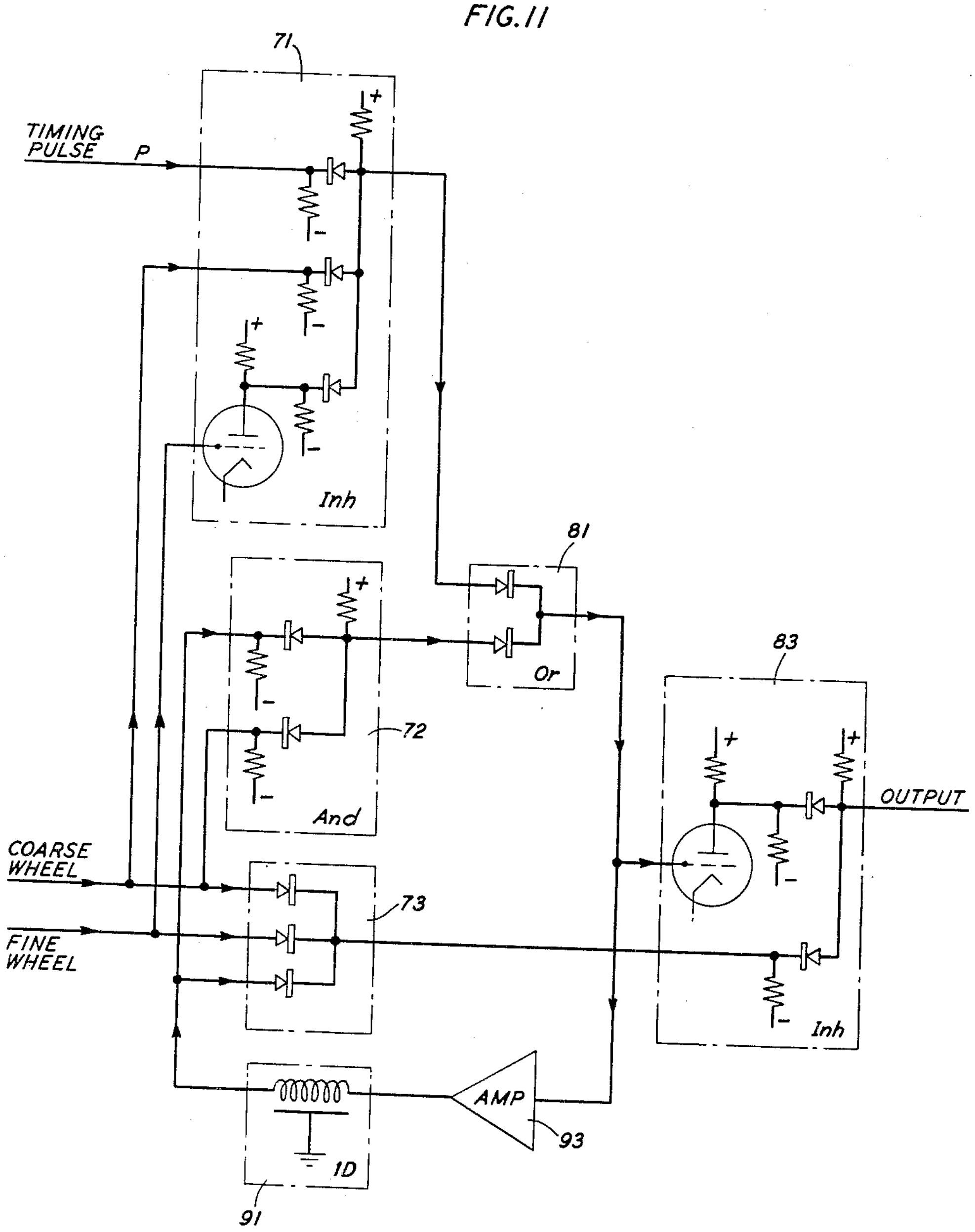
Fig. 11 is a circuit diagram realization of the logic circuit of Fig. 10.

The logical circuit shown schematically in Fig. 10 and in greater detail in Fig. 11 obeys the rules noted above. Referring first to the schematic diagram of Fig. 10, the meaning of the various symbols will now be set forth. An "Or" circuit is one which yields an output pulse when any one of the input leads is energized by a pulse. An "And" circuit is one which requires that both leads be energized by simultaneous pulses in order for an output pulse to be produced. In an "Inhibit" circuit the "Inhibit" lead which is connected to the "Inhibit" unit by a small loop must have no pulse thereon while the other input leads are energized, in order for a pulse to appear at the output. Delay circuits are indicated by a box having a "D" thereon and a number indicating the number of pulse times by which a signal is delayed.

To show that the schematic circuit of Fig. 10 operates in the manner prescribed by the rules and the truth table set forth above, various portions of a typical signal will be considered. Initially, the period represented in Fig. 9 between the least significant digit and digit number $q$ will be considered. As mentioned above, it is desired that this information be passed through the logic circuit in Fig. 10 unchanged. To show that this is true, it will be shown that the "Inhibit" unit 71 and the "And" unit 72 will have no output and that the "Or" unit 73 will have a pulse output whenever the fine wheel input lead 74 is energized during this period. From Fig. 9 it may be observed that the coarse wheel will have no output during this initial period. Therefore, the lead 75 which couples the coarse wheel input lead 76 to the "Inhibit" unit 71 will be deenergized. Inasmuch as an "Inhibit" unit 71 will require the energization of both leads 75 and 77 to realize an output pulse, the "Inhibit" unit is clearly inoperative during this period. Because the "And" unit 72 also requires an input from the lead 78 to be operative, it will also be inactive during this portion of the cycle. With the "Inhibit" unit 71 and the "And" unit 72 both inactive, the "Or" unit 81 will have no output pulse. The "Inhibit" lead 82 to the "Inhibit" unit 83 will, therefore, be deenergized. It is apparent, therefore, that the code indications from the fine wheel will pass directly through the "Or" unit 73 and the "Inhibit" unit 83 will appear at the output circuit 84 during that portion of the group of pulses shown in Fig. 9 which occur before digit $q$.

At digit number $q$, however, a timing pulse $p$ is applied to the input lead 77 of the "Inhibit" unit 71 concurrently with information applied to the fine and coarse wheel leads 74 and 76, respectively. Various conditions of energization of the fine and coarse wheel leads during the period of digit number $q$ will now be considered. Initially, when both the fine wheel and coarse wheel indications are zero or "No Pulse," the "Inhibit" unit 71, the "And" unit 72 and the "Or" unit 73 are all deenergized and there will be no output to the "Inhibit" unit 83, an dhence no output to the output lead 84, and no "Carry" signal pulse in the lead 85. When the coarse wheel indication is zero and the fine wheel indication is 1, the results are the same as those analyzed above for the time period before the presence of the digit number $q$; that is, there will be an output digit at the output lead 84 but no "Carry" pulse in the lead 85.

When the fine wheel indication is zero and the coarse wheel indication is 1, the two leads 75 and 77 to the "Inhibit" unit 71 are energized and the "Inhibit" lead 86 to the "Inhibit" unit 71 is deenergized. This will yield an output pulse to the "Or" unit 81 an, hence, a "Carry" to the lead 85. The coarse wheel pulse will pass through the "Or" unit 73 and energize the input lead 87 to the "Inhibit" unit 83, but the presence of a pulse on the "Inhibit" lead 82 of the "Inhibit" unit 83 will block this coarse wheel pulse and prevent its passage through the "Inhibit" unit 83 to the output lead 84. When both the fine wheel and the coarse wheel input leads are energized, the fine wheel input pulse is applied to the "Inhibit" lead 86 of the "Inhibit" unit 71 and this unit is thereby inactivated. With the "Inhibit" unit 71 inactive, the "Or" unit 81 is not energized and the "Inhibit" lead 82 to the lead 83 is also deenergized. This permits passage of a pulse from the "Or" unit 73 through the "Inhibit" unit 83 to the output lead 84. When pulses are present on both the fine and coarse wheel input leads, therefore, there is an output pulse but no "Carry."

The "And" unit 72 and the "Delay" unit 91 become active when there has been a "Carry" from digit number $q$ and when the next succeeding digit of the coarse wheel includes a pulse. Under these circumstances the "And" unit 72 has both input leads energized and yields an output pulse to the "Or" unit 81. This prevents a pulse from arriving at the output lead 84 by energizing the "Inhibit" lead 82 of the "Inhibit" unit 83, and also energizes the "Carry" circuit 85. This process is continued until the indications from the coarse wheel include a digit period without a pulse. This eliminates the "Carry" and for the balance of the coarse wheel indications, the output at lead 84 is identical with the coarse wheel indications. The pulse regenerating amplifier 93 in Fig. 10 is required to boost the level of the "Carry" signal so that it is commensurate with the input signal at leads 74, 76.

The various elements which were indicated in schematic form in Fig. 10 are shown in somewhat greater detail in Fig. 11. In this circuit of Fig. 11, the pulses are assumed to be positive going. In addition, the logic circuits are assumed to have no appreciable delay in comparison with the pulse repetition rate of the system. The delay unit 91 is a suitable electromagnetic delay line and may be made up of an inductance having a distributed capacitance to ground. Inasmuch as circuits of the type employed in Fig. 11 are described in the literature on computing machines they will not be discussed in detail here. Specifically, such circuits are disclosed in "The Design of Switching Circuits" by W. Keister, A. E. Richey and S. H. Washburn, D. Van Nostrand and Company, New York, 1951, in which note particularly pages 218 and 221.

In summarizing the advantages of the preferred system of Figs. 5 through 11, it may be observed that the coarse and fine wheel digit transitions have been synchronized so that errors of the type described in connection with Fig. 1 are obviated. In addition, this is true even if the transitions in the angle readings derived from the coarse and fine wheels are out of synchronism by any angle up to the angle corresponding to one-quarter revolution of the fine coded wheel. Furthermore, this synchronization has been accomplished with a minimum of physical equipment, with only one set of digit indications on each code wheel and but one reading head for each code wheel.

It is noted that R. E. Yeager's application Serial No. 315,449, filed October 18, 1952, is directed to subject matter which is closely related to that involved in the present application. More specifically, the Yeager application discloses a two-speed code wheel translator in which two complete codes are inscribed on the code wheels, and two complete reading heads are provided for each wheel.

It is to be understood that the above-described arrangements are illustrative of the application of the principles of the invention. Numerous other arrangements may be devised by those skilled in the art without departing from the spirit and scope of the invention.

What is claimed is:

1. In an analogue-digital translating system, a coarse code wheel and a fine code wheel coupled to said coarse wheel, means including a plurality of digit rings having indications in reflected binary code relationship with each other on each of said wheels and a single reading element for each of said digit rings for establishing a binary representation of the position of said wheels, the least significant digit established by the coarse wheel reading elements corresponding to one-half revolution of said fine wheel, said reading elements for said fine wheel having a predetermined zero position, and the zero position for said coarse wheel reading elements being offset from the true zero position as determined by said zero position of said fine wheel by an angle corresponding to approximately one quarter revolution of said fine wheel.

2. In an analogue-digital converter, a fine code wheel having a single binary code including a plurality of digits incorporated thereon, a single reading head for said fine code wheel mounted along the zero index line of said fine code wheel, a coarse code wheel coupled to said fine code wheel, said coarse code wheel having a single binary code including a plurality of digits incorporated thereon, and a single reading head for said coarse code wheel mounted at an angle to the zero index line for said coarse code wheel, said angle corresponding to substantially one quarter revolution of said fine code wheel.

3. A converter as defined in claim 2 wherein logical circuit means are provided for combining the binary information from said fine and coarse code wheels.

4. In an analogue-digital converter, a fine code wheel having a single binary code including a plurality of digits incorporated thereon, a reading head for said fine code wheel mounted along the zero index line of said fine code wheel, a coarse code wheel coupled to said fine code wheel, said coarse code wheel having a single binary code including a plurality of digits incorporated thereon, said binary code indicating half revolutions of said fine code wheel, and a reading head for said coarse code wheel mounted at an angle to the zero index line for said coarse code wheel, said angle corresponding to approximately one quarter revolution of said fine code wheel.

5. In an analogue-digital converter, a fine code wheel having a single binary code including a plurality of digits incorporated thereon, a reading mechanism for said fine code wheel mounted along the zero index position for the fine code wheel, a coarse code indicating element coupled to said fine code wheel, said coarse code indicating element having a single binary code including a plurality of digits incorporated thereon, and a single reading means for said coarse code indicating element displaced from the zero index line for said coarse code digits by a distance corresponding to substantially one quarter revolution of said fine code wheel.

6. A converter as defined in claim 5 wherein logical circuital means are provided for combining the binary information from said fine code wheel and from said coarse code indicating element.

7. A converter as defined in claim 5 wherein logical circuital means are provided for simulating a second code reading means for said coarse code indicating element.

8. A converter as defined in claim 5 wherein the least significant digit of said coarse code indicating element indicates half revolutions of said fine code wheel.

No references cited.